(12) United States Patent
Hutton

(10) Patent No.: US 7,392,561 B2
(45) Date of Patent: Jul. 1, 2008

(54) AUTOMATED PASSENGER BOARDING BRIDGE ALIGNMENT SYSTEM AND METHOD WITH MANUAL CONFIRMATION OF AIRCRAFT DOORWAY POSITION

(75) Inventor: Neil Hutton, Ottawa (CA)

(73) Assignee: DEW Engineering and Development Limited, Ottawa, Ontario (CA)

( * ) Notice: Subject to any disclaimer, the term of this patent is extended or adjusted under 35 U.S.C. 154(b) by 203 days.

(21) Appl. No.: 11/157,934

(22) Filed: Jun. 22, 2005

(65) Prior Publication Data

US 2006/0288502 A1     Dec. 28, 2006

(51) Int. Cl.
*E01D 1/00* (2006.01)
*E01D 15/00* (2006.01)
*E01D 15/10* (2006.01)

(52) U.S. Cl. ...................................................... 14/71.5
(58) Field of Classification Search ................... 14/69.5, 14/71.5; 340/958; 250/206.1, 221, 559.29
See application file for complete search history.

(56) References Cited

U.S. PATENT DOCUMENTS

| | | | | |
|---|---|---|---|---|
| 5,226,204 | A * | 7/1993 | Schoenberger et al. | 14/71.5 |
| 5,552,983 | A * | 9/1996 | Thornberg et al. | 701/23 |
| 5,734,736 | A * | 3/1998 | Palmer et al. | 382/103 |
| 5,855,035 | A * | 1/1999 | Streeter et al. | 14/71.5 |
| 6,637,063 | B1 | 10/2003 | Hutton et al. | |
| 6,742,210 | B2 | 6/2004 | Hutton et al. | |
| 6,757,927 | B2 | 7/2004 | Hutton et al. | |
| 6,866,232 | B1 * | 3/2005 | Finney | 244/172.4 |
| 6,907,635 | B2 | 6/2005 | Hutton et al. | |
| 2006/0277699 | A1 | 12/2006 | Hutton | |
| 2006/0287780 | A1 | 12/2006 | Hutton | |
| 2006/0288503 | A1 | 12/2006 | Hutton | |

OTHER PUBLICATIONS

U.S. Appl. No. 11/518,178, filed Sep. 11, 2006, Hutton.
U.S. Appl. No. 11/519,968, filed Sep. 13, 2006, Hutton.
U.S. Appl. No. 11/589,754, filed Oct. 31, 2006, Hutton.

* cited by examiner

*Primary Examiner*—Raymond W Addie
(74) *Attorney, Agent, or Firm*—Freedman & Associates

(57) ABSTRACT

A system for aligning an aircraft-engaging end of a passenger boarding bridge to a doorway along a lateral surface of an aircraft includes a receiver that is located aboard the aircraft for receiving a signal, including image data for being displayed to a user aboard the aircraft. The system further includes a display device located aboard the aircraft and in communication with the receiver, the display device for receiving the image data from the receiver and for displaying the image data in a human intelligible form to the user aboard the aircraft. A user interface is also located aboard the aircraft for receiving an input signal from the user, which is indicative of one of a go command and a no-go command for automatically aligning the passenger boarding bridge, and for providing data relating to the input signal. Additionally, a transmitter is located aboard the aircraft and in communication with the user interface, the transmitter for receiving the data relating to the input signal and for transmitting a second signal including the data relating to the input signal. During use, the image data relates to features along a lateral surface of the aircraft, the lateral surface including the doorway to which the passenger boarding bridge is to be aligned.

26 Claims, 4 Drawing Sheets

AUTOMATED PASSENGER BOARDING BRIDGE ALIGNMENT SYSTEM AND METHOD WITH MANUAL CONFIRMATION OF AIRCRAFT DOORWAY POSITION

FIELD OF THE INVENTION

The instant invention relates generally to a system and method for aligning a passenger boarding bridge to a doorway that is disposed along a lateral surface of an aircraft, and more particularly to an automated passenger boarding bridge alignment system and method with manual confirmation of aircraft doorway position.

BACKGROUND

In order to make aircraft passengers comfortable, and in order to transport them between an airport terminal building and an aircraft in such a way that they are protected from weather and other environmental influences, passenger boarding bridges are used which can be telescopically extended and the height of which is adjustable. For instance, an apron drive bridge in present day use includes a plurality of adjustable modules, including: a rotunda, a telescopic tunnel, a bubble section, a cab, and elevating columns with wheel carriage. Manual, semi-automated and fully-automated bridge alignment systems are known for adjusting the position of the passenger boarding bridge relative to an aircraft, for instance to compensate for different sized aircraft and to compensate for imprecise parking of an aircraft at an airport terminal.

Automated bridge alignment systems provide a number of advantages compared to manual and semi-automated systems. For instance, automated bridge alignment systems do not require a human operator, and therefore the costs that are associated with training and paying the salaries of human bridge operators are reduced. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft travel.

Of course, automated bridge alignment systems require accurate and precise identification regarding the position of the doorway to which the passenger boarding bridge is to be aligned. It is a disadvantage of known automated bridge alignment systems that environmental conditions, surface marking of the aircraft, incorrect identification of aircraft model, etc. may result in the doorway position being improperly identified. In this case, the passenger boarding bridge may be driven into contact with the aircraft, resulting in damage that is sufficient to render the aircraft unfit to continue service. Delays resulting from damage to an aircraft are costly to the airlines and cause significant inconvenience to passengers.

It would be advantageous to provide a system and method that overcomes at least some of the above-mentioned limitations of the prior art.

SUMMARY OF EMBODIMENTS OF THE INVENTION

In accordance with an aspect of the instant invention there is provided a system for automatically aligning an aircraft-engaging end of a passenger boarding bridge to a doorway of an aircraft, comprising: a first receiver disposed aboard the aircraft for receiving a first signal including image data for being displayed to a user aboard the aircraft; a display device disposed aboard the aircraft and in communication with the first receiver, the display device for receiving the image data from the first receiver and for displaying the image data in a human intelligible form to the user aboard the aircraft; a user interface disposed aboard the aircraft for receiving an input signal from the user that is indicative of one of a go command and a no-go command for automatically aligning the passenger boarding bridge, and for providing data relating to the input signal; and, a first transmitter disposed aboard the aircraft and in communication with the user interface, the transmitter for receiving the data relating to the input signal and for transmitting a second signal including the data relating to the input signal, wherein the image data relates to features along a lateral surface of the aircraft, the lateral surface including the doorway to which the passenger boarding bridge is to be aligned.

In accordance with another aspect of the instant invention there is provided a method of automatically aligning an aircraft-engaging end of a passenger boarding bridge to a doorway disposed along a lateral surface of an aircraft, comprising: capturing an image of a portion of the lateral surface using an imager disposed at a location that is remote from the aircraft; processing data relating to the captured image to identify a feature that is indicative of a location of the doorway; determining a location of the doorway in dependence upon the identified feature; formatting the data relating to the captured image so as to provide an image for display to a user aboard the aircraft and containing a human intelligible indication of the determined location of the doorway; using a display device disposed aboard the aircraft, displaying to the user aboard the aircraft the formatted data in the form of an image containing the human intelligible indication of the determined location of the doorway; and, in dependence upon receiving an indication from the user aboard the aircraft that the determined location of the doorway is an actual location of the doorway, aligning automatically the passenger boarding bridge to the doorway at the determined location of the doorway.

In accordance with another aspect of the instant invention there is provided a system for automatically aligning an aircraft-engaging end of a passenger boarding bridge with a doorway of an aircraft, comprising: an imager disposed at a location remote from the aircraft for capturing an image of the lateral surface of the aircraft and for providing image data relating thereto; a first receiver disposed aboard the aircraft for receiving a first signal including the image data; a processor for processing the image data to determine a location of the doorway and to format the image data for display, so as to provide a human intelligible indication of the determined location of the doorway; a display device disposed aboard the aircraft and in communication with the processor, the display device for receiving the formatted image data from the processor and for displaying to the user aboard the aircraft the formatted image data in a human intelligible form; a user interface disposed aboard the aircraft for receiving an input signal from the user that is indicative of one of a go command and a no-go command for automatically aligning the passenger boarding bridge, and for providing data relating to the input signal; a transmitter disposed aboard the aircraft and in communication with the user interface, the transmitter for receiving the data relating to the input signal and for transmitting a second signal including the data relating to the input signal; and, a bridge controller for receiving the second signal and for initiating automated alignment of the passenger boarding bridge when the second signal is indicative of a go command and for disabling automated alignment of the passenger boarding bridge when the second signal is indicative of a no-go command.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
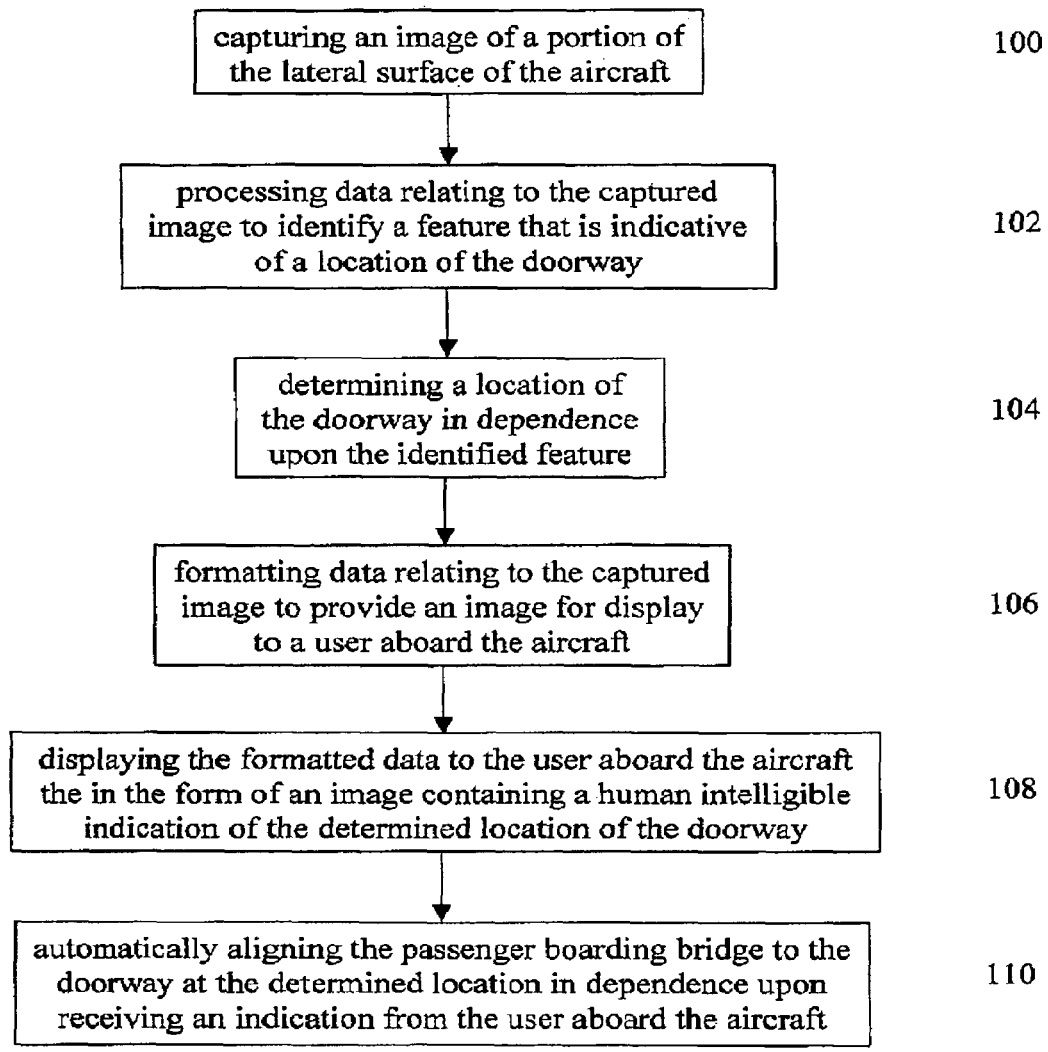
FIG. 1 is a simplified flow diagram of a method of automatically aligning an aircraft-engaging end of a passenger boarding bridge to a doorway disposed along a lateral surface of an aircraft, according to an embodiment of the instant invention.

Referring to FIG. 1, shown is a simplified flow diagram of a method of automatically aligning an aircraft-engaging end of a passenger boarding bridge to a doorway disposed along a lateral surface of an aircraft, according to an embodiment of the instant invention. At step 100, an image of a portion of the lateral surface of the aircraft is captured using an imager disposed at a location that is remote from the aircraft. For instance, the imager is disposed near the aircraft-engaging end of the passenger boarding bridge. Some non-limiting examples of imager types that are suitable for use with this method include: a digital still camera; a digital video camera, etc. At step 102, data relating to the captured image is processed to identify a feature that is indicative of a location of the doorway. For instance, image data is provided from the imager to a processor of an automated bridge controller. Features that may be identified include but are not limited to: the door outline; the doorsill; the door handle; the door window, etc. At step 104, a location of the doorway is determined in dependence upon the identified feature. For instance, the processor retrieves data from a database that relates the position of the doorway and the identified feature for a plurality of known types of aircraft. At step 106, the data relating to the captured image is formatted so as to provide an image for display to a user aboard the aircraft. In particular, the data is formatted such that the displayed image derived therefrom contains a human intelligible indication of the determined location of the doorway. For instance, the data is formatted such that the determined location of the doorway is one of centered in the image and highlighted. Highlighting the determined location of the doorway may include displaying an outline representative of the outline of the doorway, which is superimposed upon the actual image data. Alternatively, highlighting of the determined location includes modifying at least one of the colour and intensity of the determined doorway. At step 108, the formatted data is displayed to the user aboard the aircraft the in the form of an image containing the human intelligible indication of the determined location of the doorway. For instance, the image is displayed using a display device disposed aboard the aircraft. Some non-limiting examples of display devices for use with this method include: a touch sensitive screen, a LCD screen; a CRT screen, etc. Optionally, the display device is installed by the aircraft manufacturer or as an after-market retrofit. At step 110, in dependence upon receiving an indication from the user aboard the aircraft that the determined location of the doorway is an actual location of the doorway, the passenger boarding bridge aligns automatically to the doorway at the determined location of the doorway. According to the above-described method, the user aboard the aircraft confirms visually that the determined location of the doorway, as determined by for instance the processor of the bridge controller, is the actual location of the doorway. Once confirmed, a signal is transmitted, for instance using a wireless transmitter, to a receiver that is in communication with the processor. The wireless signal includes a "go" signal or some other indication that the automated bridge alignment operation should be performed. Optionally, the wireless signal is an optical signal or a radio-frequency signal. Optionally, the wireless signal includes a unique identifier for supporting secure communication between the passenger boarding bridge and the aircraft during a current alignment operation.

Further optionally, the data relating to the captured image is processed and/or formatted as described above subsequent to the data being wirelessly transmitted to a receiver aboard the aircraft. In this case, a processor aboard the aircraft carries the computational burden of determining the doorway location and formatting the image for display to the user.

Of course, in dependence upon receiving an indication from the user aboard the aircraft that the determined location of the doorway is not the actual location of the doorway, an automated alignment function of the passenger boarding bridge preferably is disabled. In such a case, it may be necessary to complete the alignment operation in a manual fashion.

Figure 2:
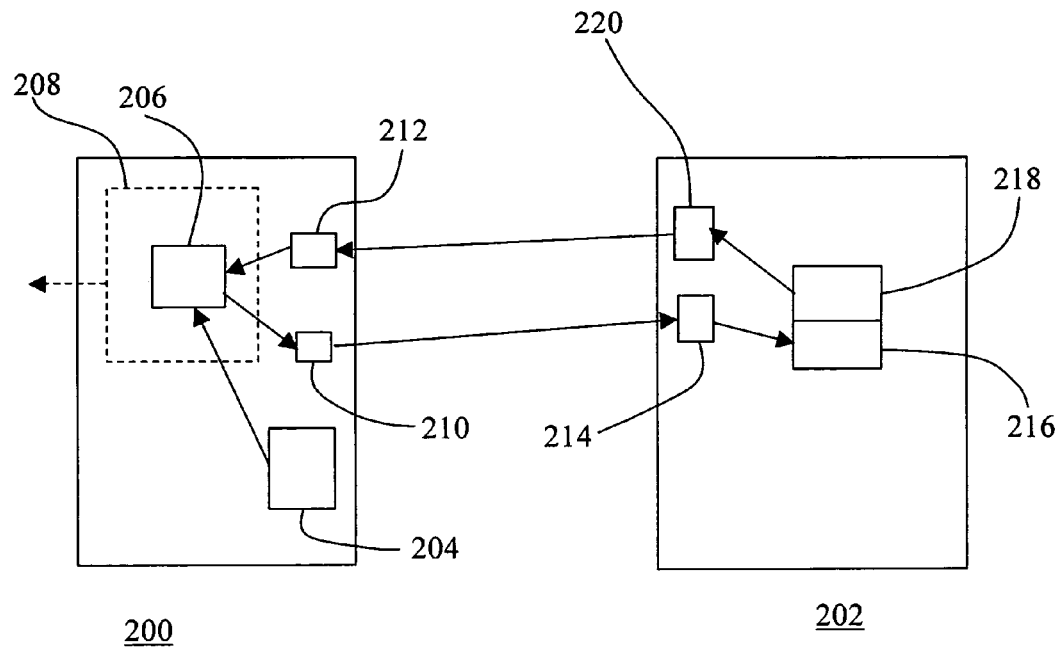
FIG. 2 is a simplified block diagram of a system according to an embodiment of the instant invention.

Referring now to FIG. 2, shown is a simplified block diagram of a system according to an embodiment of the instant invention. The system includes components shown generally at 200, which are disposed at a location that is remote from the aircraft, and components shown generally at 202, which are disposed aboard the aircraft. By way of one non-limiting example, which is provided for illustrative purposes only and is not intended to in any way limit the scope of the invention, the components 200 are disposed near an aircraft-engaging end of a passenger boarding bridge, and the components 202 are disposed in the cockpit area of an aircraft. The components 200 include an imager 204, a processor 206 such as for instance a processor of an automated bridge controller 208, a transmitter 210 and a receiver 212. The components 202 include a receiver 214, a display device 216, a user interface 218 and a transmitter 220. Optionally, the components 200 also include at least a light (not shown) for illuminating the lateral surface of the aircraft including the doorway when operating under poor lighting conditions. For instance, a light source such as for instance a bank of lights is provided for illuminating the lateral surface of the aircraft including the doorway during nighttime operation. Further optionally, a plurality of light sources, such as for instance a plurality of light banks, is provided to support operation of the system under a variety of poor lighting conditions. For instance, two or more banks of lights are used simultaneously to illuminate the lateral surface of the aircraft including the doorway when operating in rainy or snowy conditions.

Referring still to FIG. 2, the imager 204 is disposed for capturing an image of a lateral surface of an aircraft including a doorway to which the aircraft-engaging end of the passenger boarding bridge is to be aligned. Optionally, the imager is disposed at the aircraft-engaging end of the passenger boarding bridge, or at some other location such as along a terminal building wall near the passenger boarding bridge. The imager 204 is provided in the form of, for instance, a digital still camera, a digital video camera, etc. Of course, any other imager that is suitable for capturing an image of the lateral surface of an aircraft may be used. During use, the imager 204 provides image data to the processor 206. The processor 206 processes the image data prior to display by the display device 216, to determine a location of the doorway and to format the image data for display so as to provide a human intelligible indication of the determined location of the doorway. The processor 206 provides formatted image data to the transmitter 210, which then wirelessly transmits a signal including the formatted image data to a receiver 214 aboard the aircraft. An output signal is provided from the receiver 214 to the display device 216. The display device displays the formatted image data in a human intelligible form to the user aboard the aircraft. The user aboard the aircraft, such as for instance the aircraft pilot, uses the user interface 218 disposed aboard the aircraft to provide an input signal that is indicative of one of a go command and a no-go command for automatically aligning the passenger boarding bridge. For instance, if the user is satisfied that the image data being displayed by the display device 216 correctly identifies the position of the doorway to which the aircraft-engaging end of the passenger boarding bridge is to be aligned, then the user actuates a first control switch of the user interface 218. If on the other hand the user is not satisfied that the image data being displayed by the display device 216 correctly identifies the position of the doorway to which the aircraft-engaging end of the passenger boarding bridge is to be aligned, then the user actuates a second control switch of the user interface 218. In dependence upon whether the first or second control switch was actuated by the user, the user interface 218 provides an output signal indicative of either a go command or a no-go command to the transmitter 220. The transmitter 220 transmits a signal to the receiver 212, which receives the signal and provides an output signal to the processor 206. In the instant example, the processor 206 is a processor of an automated bridge controller 208. If the output signal is indicative of a go command, then the automated bridge controller automatically aligns the aircraft-engaging end of the passenger boarding bridge with the doorway of the aircraft. If the output signal is indicative of a no-go command, then the automated bridge controller automatically disables the automated alignment function, and an alarm is sounded or a human bridge controller is called for automatically.

Actuating a control switch is performed optionally by depressing a button, by toggling or throwing a switch, by providing a biometric input at a predetermined portion of a biometric information reader or by providing a token to a predetermined portion of a token reader. In one non-limiting example, the user depresses a green colored button to signal a go command and depresses a red colored button to signal a no-go command. The buttons or switches are optionally mechanical or electronic buttons or switches or virtual buttons or switches as displayed by a touch sensitive screen of the display device 216. Optionally, the user must provide a biometric sample or provide a security token before the system will accept commands using other buttons or switches. Further optionally, the second control switch of the user interface 218, such as for instance the above-mentioned red colored button, remains active subsequent to the first control switch of the user interface 218, such as for instance the above-mentioned green colored button, being actuated. In this way, the user may continue to monitor the displayed image and at any time provide a no-go command by actuating the second control switch, so as to cause the automated bridge controller to disable the automated alignment function.

Of course, any suitable combinations of transmitters 210/220 and receivers 212/214 may be used, such as for instance a radio-frequency receiver/transmitter pair or an optical receiver/transmitter. When a plurality of passenger boarding bridges, and therefore a plurality of transmitters, is installed at an airport terminal, optionally each radio-frequency transmitter transmits using a different frequency in order to reduce interference and cross-talk. In the case of optical transmitters, any suitable wavelength that is selected from the infrared, visible and ultra-violet regions of the electromagnetic spectrum may be used. Since optical transmitters are highly directional, and accordingly the chances of interference or cross-talk is low, optionally each transmitter uses a different wavelength or a same wavelength.

Figure 3:
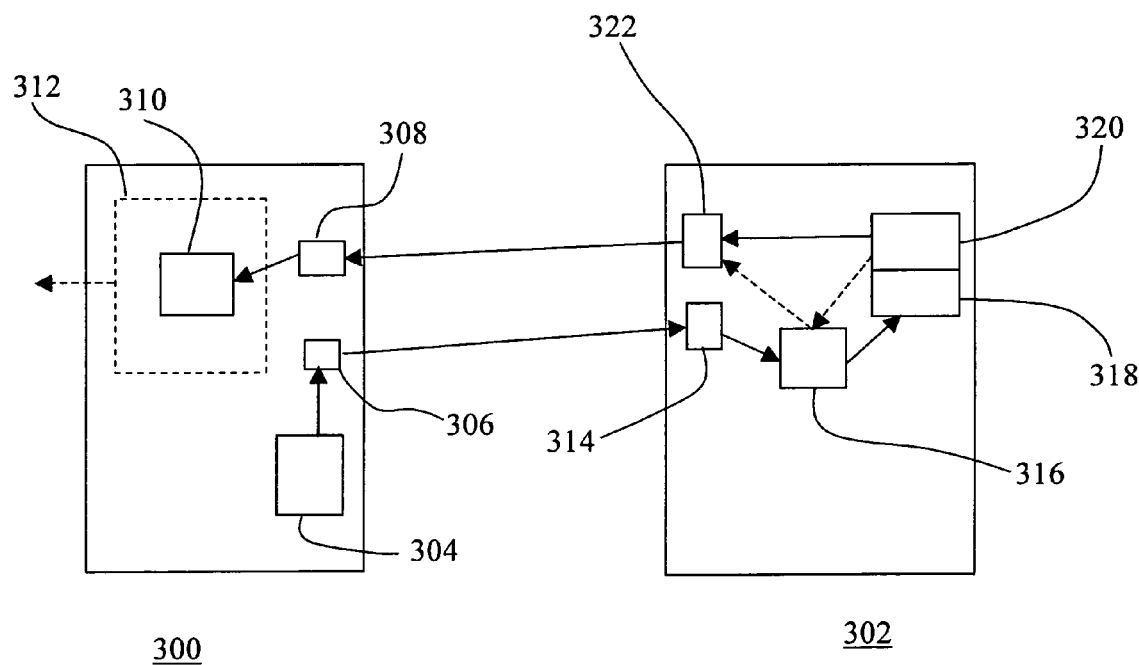
FIG. 3 is a simplified block diagram of another system according to an embodiment of the instant invention.

Referring now to FIG. 3, shown is a simplified block diagram of a system according to an embodiment of the instant invention. The system includes components shown generally at 300, which are disposed at a location that is remote from the aircraft, and components shown generally at 302, which are disposed aboard the aircraft. By way of one non-limiting example, which is provided for illustrative purposes only and is not intended to in any way limit the scope of the invention, the components 300 are disposed near an aircraft-engaging end of a passenger boarding bridge, and the components 302 are disposed in the cockpit area of an aircraft. The components 300 include an imager 304, a transmitter 306, a receiver 308, and a processor 310 such as for instance a processor of an automated bridge controller 312. The components 302 include a receiver 314, a processor 316, a display device 318, a user interface 320 and a transmitter 322. Optionally, the components 300 also include at least a light (not shown) for illuminating the lateral surface of the aircraft including the doorway when operating under poor lighting conditions. For instance, a light source such as for instance a bank of lights is provided for illuminating the lateral surface of the aircraft including the doorway during nighttime operation. Further optionally, a plurality of light sources, such as for instance a plurality of light banks, is provided to support operation of the system under a variety of poor lighting conditions. For instance, two or more banks of lights are used simultaneously to illuminate the lateral surface of the aircraft including the doorway when operating in rainy or snowy conditions.

Referring still to FIG. 3, the imager 304 is disposed for capturing an image of a lateral surface of an aircraft including a doorway to which the aircraft-engaging end of the passenger boarding bridge is to be aligned. Optionally, the imager is disposed at the aircraft-engaging end of the passenger boarding bridge, or at some other location such as along a terminal building wall near the passenger boarding bridge. The imager 304 is provided in the form of, for instance, a digital still camera, a digital video camera, etc. Of course, any other imager that is suitable for capturing an image of the lateral surface of an aircraft may be used. During use, the imager 304 provides image data to the transmitter 306, which then wirelessly transmits a signal including the image data to a receiver 314 aboard the aircraft. An output signal is provided from the receiver 314 to the processor 316. The processor 316 processes the image data prior to display by the display device 318, to determine a location of the doorway and to format the image data for display so as to provide a human intelligible indication of the determined location of the doorway. The processor 316 then provides the formatted image data to the display device 318, which displays the formatted image data in a human intelligible form to the user aboard the aircraft. The user aboard the aircraft, such as for instance the aircraft pilot, uses the user interface 320 disposed aboard the aircraft to provide an input signal that is indicative of one of a go command and a no-go command for automatically aligning the passenger boarding bridge. For instance, if the user is satisfied that the image data being displayed by the display device 318 correctly identifies the position of the doorway to which the aircraft-engaging end of the passenger boarding bridge is to be aligned, then the user actuates a first control switch of the user interface 320. If on the other hand the user is not satisfied that the image data being displayed by the display device 318 correctly identifies the position of the doorway to which the aircraft-engaging end of the passenger boarding bridge is to be aligned, then the user actuates a second control switch of the user interface 320. In dependence upon whether the first or second control switch was actuated by the user, the user interface 320 provides an output signal indicative of either a go command or a no-go command to the transmitter 322. The transmitter 322 transmits a signal to the receiver 308, which receives the signal and provides an output signal to the processor 310. In the instant example, the processor 310 is a processor of an automated bridge controller 312. If the output signal is indicative of a go command, then the automated bridge controller automatically aligns the aircraft-engaging end of the passenger boarding bridge with the doorway of the aircraft. If the output signal is indicative of a no-go command, then the automated bridge controller automatically disables the automated alignment function, and an alarm is sounded or a human bridge controller is called for automatically.

Actuating a control switch is performed optionally by depressing a button, by toggling or throwing a switch, by providing a biometric input at a predetermined portion of a biometric information reader or by providing a token to a predetermined portion of a token reader. In one non-limiting example, the user depresses a green colored button to signal a go command and depresses a red colored button to signal a no-go command. The buttons or switches are optionally mechanical or electronic buttons or switches or virtual buttons or switches as displayed by a touch sensitive screen of the display device 318. Optionally, the user must provide a biometric sample or provide a security token before the system will accept commands using other buttons or switches. Further optionally, the second control switch of the user interface 320, such as for instance the above-mentioned red colored button, remains active subsequent to the first control switch of the user interface 320, such as for instance the above-mentioned green colored button, being actuated. In this way, the user may continue to monitor the displayed image and at any time provide a no-go command by actuating the second control switch, so as to cause the automated bridge controller to disable the automated alignment function.

Of course, any suitable combinations of transmitters 306/322 and receivers 308/314 may be used, such as for instance a radio-frequency receiver/transmitter pair or an optical receiver/transmitter. When a plurality of passenger boarding bridges, and therefore a plurality of transmitters, is installed at an airport terminal, optionally each radio-frequency transmitter transmits using a different frequency in order to reduce interference and cross-talk. In the case of optical transmitters, any suitable wavelength that is selected from the infrared, visible and ultra-violet regions of the electromagnetic spectrum may be used. Since optical transmitters are highly directional, and accordingly the chances of interference or cross-talk is low, optionally each transmitter uses a different wavelength or a same wavelength.

Figure 4A:
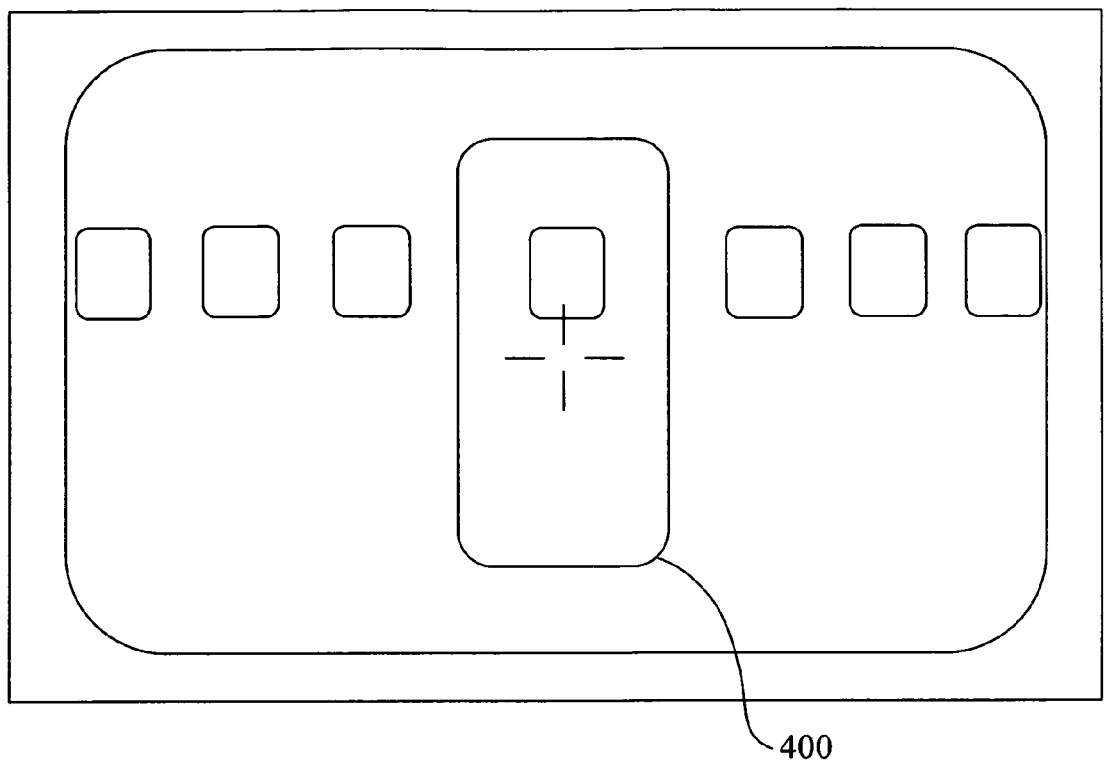
FIG. 4a is a simplified schematic diagram showing displayed formatted image data with the doorway position centered correctly in the image.

Referring now to FIG. 4a, shown is a simplified schematic diagram showing displayed formatted image data with the doorway position centered correctly in the image. FIG. 4a shows the type of image data that is indicative of the position of the doorway 400 being correctly identified. In such a case, a go command is appropriately provided for initiating the automated docking procedure.

Figure 4B:
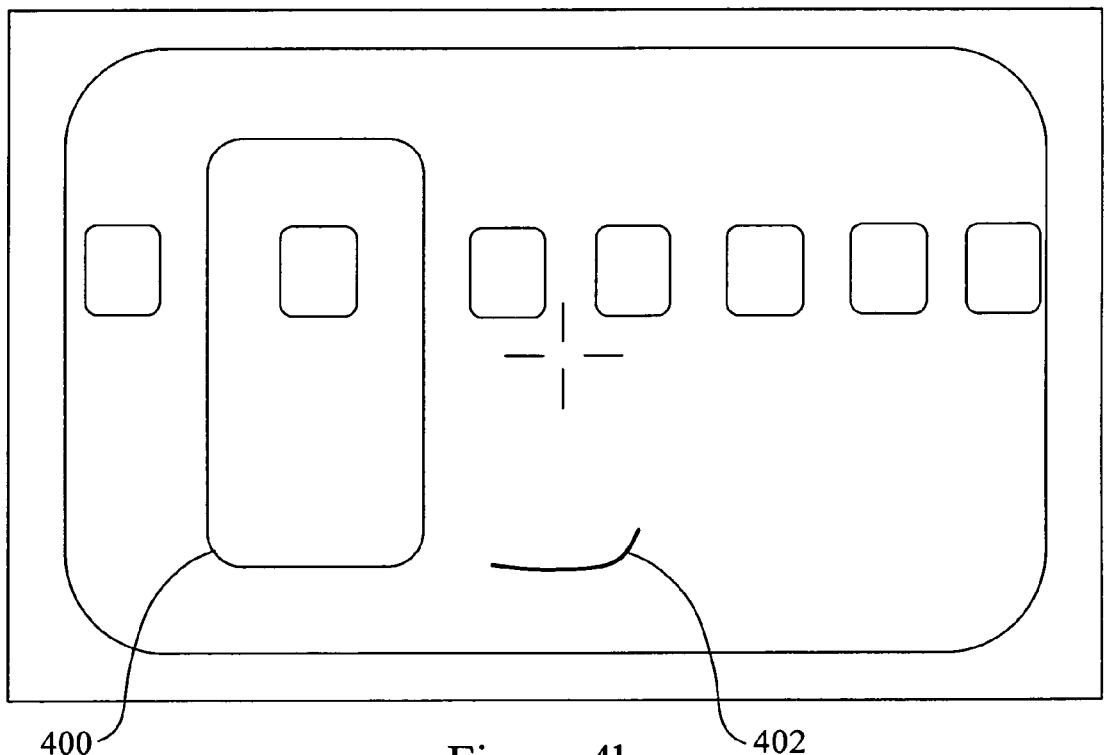
FIG. 4b is a simplified schematic diagram showing displayed formatted image data with the doorway position not centered correctly in the image.

Referring now to FIG. 4b, shown is a simplified schematic diagram showing displayed formatted image data with the doorway position not centered correctly in the image. FIG. 4b shows the type of image data that is indicative of the position of the doorway 400 being incorrectly identified. For instance, a marking 402 along the lateral surface of the aircraft has been misidentified as a feature indicative of the position of the doorway 400. In such a case, the user aboard the aircraft could visually distinguish the marking 402 and recognize that the position of the doorway 400 has been misidentified. Accordingly, a no-go command is appropriately provided for disabling the automated docking procedure.

Figure 5A:
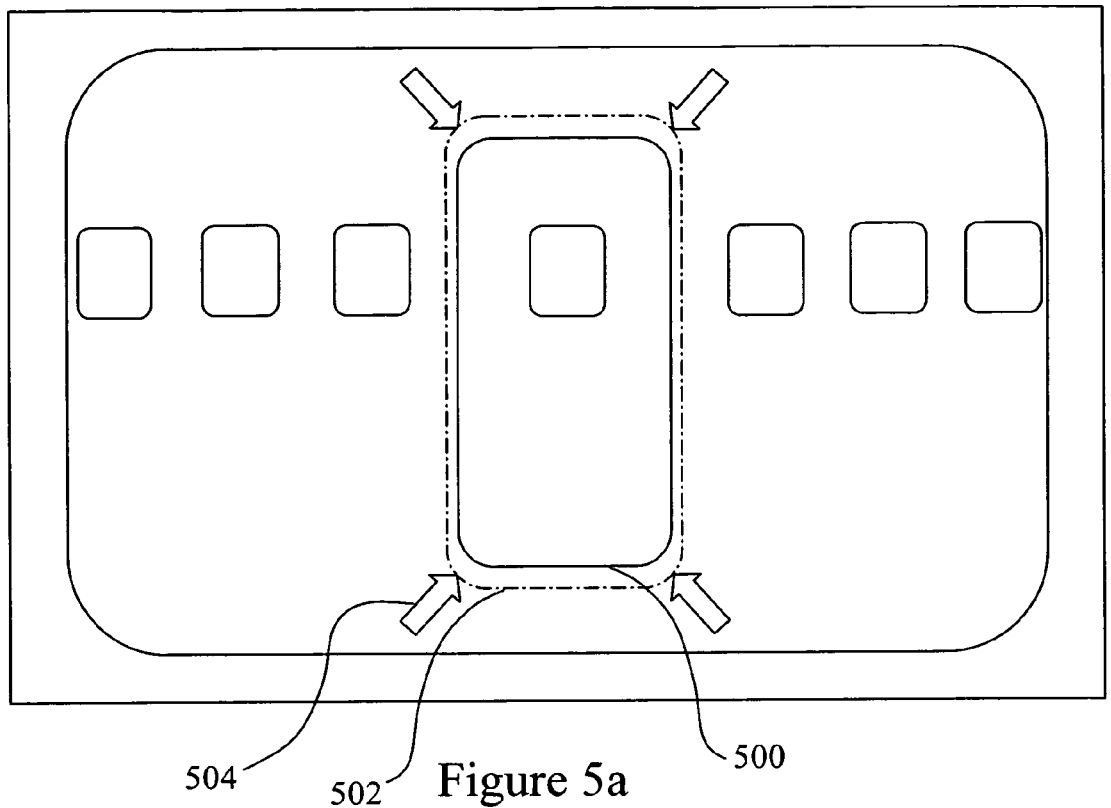
FIG. 5a is a simplified schematic diagram showing displayed formatted image data with supplemental image data correctly identifying the doorway position within the captured image; and, FIG. 5b is a simplified schematic diagram showing displayed formatted image data with supplemental image data not correctly identifying the doorway position within the captured image.

Referring now to FIG. 5a, shown is a simplified schematic diagram showing displayed formatted image data with supplemental image data correctly identifying the doorway position within the captured image. FIG. 5a shows the type of image data that is indicative of the position of the doorway 500 being correctly identified. In FIG. 5a, the supplemental image data, which is superimposed upon the captured image data, includes an outline 502 around the periphery of the doorway 500, and a plurality of arrows or other indicators pointing in a direction toward the outline 502. Optionally, the plurality or arrows or other indicators is highly contrasting with the image or flashing, or both. In such a case, a go command is appropriately provided for initiating the automated docking procedure.

Figure 5B:
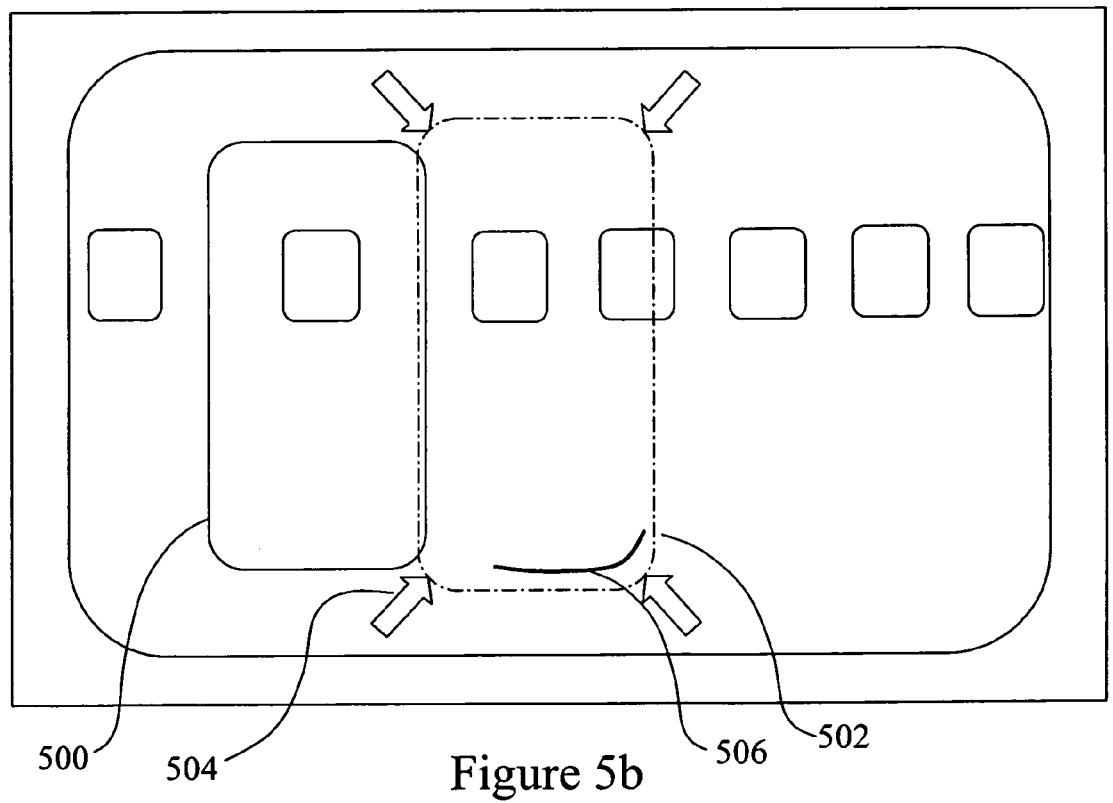

Referring now to FIG. 5b, shown is a simplified schematic diagram showing displayed formatted image data with supplemental image data not correctly identifying the doorway position within the captured image. FIG. 5b shows the type of image data that is indicative of the position of the doorway 500 being incorrectly identified. In FIG. 5b, the supplemental image data, which is superimposed upon the captured image data, includes an outline 502 and a plurality of arrows or other indicators pointing in a direction toward the outline 502. Optionally, the plurality or arrows or other indicators is highly contrasting with the image or flashing, or both. In FIG. 5b, a marking 506 along the lateral surface of the aircraft has been misidentified as a feature indicative of the position of the doorway 500. In such a case, the user aboard the aircraft could visually distinguish the marking 506 and recognize that the position of the doorway 500 has been misidentified. Accordingly, a no-go command is appropriately provided for disabling the automated docking procedure.

Numerous other embodiments may be envisaged without departing from the spirit and scope of the invention.

What is claimed is:

1. A system for automatically aligning an aircraft-engaging end of a passenger boarding bridge to a doorway of an aircraft, comprising:
   a first receiver disposed aboard the aircraft for receiving a first signal including image data for being displayed to a user aboard the aircraft;
   a display device disposed aboard the aircraft and in communication with the first receiver, the display device for receiving the image data from the first receiver and for displaying the image data in a human intelligible form to the user aboard the aircraft;
   a user interface disposed aboard the aircraft for receiving an input signal from the user that is indicative of one of a go command and a no-go command for automatically aligning the passenger boarding bridge, and for providing data relating to the input signal; and,
   a first transmitter disposed aboard the aircraft and in communication with the user interface, the transmitter for receiving the data relating to the input signal and for transmitting a second signal including the data relating to the input signal,
   wherein the image data relates to features along a lateral surface of the aircraft, the lateral surface including the doorway to which the passenger boarding bridge is to be aligned.

2. A system according to claim 1, comprising an imager disposed at a location remote from the aircraft for capturing the image data.

3. A system according to claim 2, comprising a second transmitter in communication with the imager for receiving the image data therefrom and for transmitting the first signal including the image data.

4. A system according to claim 3, comprising a second receiver for receiving the second signal and for providing an output signal in dependence thereon, the output signal relating to the input signal from the user aboard the aircraft.

5. A system according to claim 4, comprising a bridge controller in communication with the second receiver for receiving the output signal therefrom, the bridge controller for initiating automated alignment of the passenger boarding bridge to the doorway when the output signal is indicative of a go command and for disabling automated alignment of the passenger boarding bridge to the doorway when the output signal is indicative of a no-go command.

6. A system according to claim 2, comprising at least a light source for illuminating a portion of the lateral surface of the aircraft that is being imaged by the imager.

7. A system according to claim 1, comprising a processor for processing the image data prior to display by the display device, to determine a location of the doorway and to format the image data for display so as to provide a human intelligible indication of the determined location of the doorway.

8. A system according to claim 1, wherein the display device comprises a touch sensitive screen and wherein the user interface comprises at least one of a virtual button and an iconic symbol displayed by the touch sensitive screen.

9. A system according to claim 1, wherein the user interface comprises a biometric information reader.

10. A system according to claim 1, wherein the user interface comprises a security token reader.

11. A system according to claim 1, wherein the user interface and the display device are disposed within a cockpit portion of the aircraft.

12. A method of automatically aligning an aircraft-engaging end of a passenger boarding bridge to a doorway disposed along a lateral surface of an aircraft, comprising:
   capturing an image of a portion of the lateral surface using an imager disposed at a location that is remote from the aircraft;
   processing data relating to the captured image to identify a feature that is indicative of a location of the doorway;
   determining a location of the doorway in dependence upon the identified feature;
   formatting the data relating to the captured image so as to provide an image for display to a user aboard the aircraft and containing a human intelligible indication of the determined location of the doorway;
   using a display device disposed aboard the aircraft, displaying to the user aboard the aircraft the formatted data in the form of an image containing the human intelligible indication of the determined location of the doorway; and,
   in dependence upon receiving an indication from the user aboard the aircraft that the determined location of the doorway is an actual location of the doorway, aligning automatically the passenger boarding bridge to the doorway at the determined location of the doorway.

13. A method according to claim 12, wherein formatting the data relating to the captured image comprises centering the determined location of the doorway in the image for display to a user aboard the aircraft.

14. A method according to claim 12, wherein formatting the data relating to the captured image comprises providing a visually discernable indication of the determined location of the doorway within the image for display to a user aboard the aircraft.

15. A method according to claim 12, comprising in dependence upon receiving an indication from the user aboard the aircraft that the determined location of the doorway is not the actual location of the doorway, disabling an automated alignment function of the passenger boarding bridge.

16. A method according to claim 12, comprising wirelessly transmitting data including data relating to the captured image to a receiver disposed aboard the aircraft.

17. A method according to claim 16, wherein the wirelessly transmitted data is formatted for display to a user aboard the aircraft prior to being wirelessly transmitted.

18. A method according to claim 16, wherein the wirelessly transmitted data is formatted for display to a user aboard the aircraft subsequent to being wirelessly transmitted.

19. A method according to claim 16, wherein the wirelessly transmitted data includes a unique identifier for supporting secure communication between the passenger boarding bridge and the aircraft during a current alignment operation.

20. A method according to claim 12, wherein the indication from the user aboard the aircraft is encoded as data for being wirelessly transmitted to a receiver that is in communication with a bridge controller of the passenger boarding bridge.

21. A method according to claim 20, wherein the encoded data includes a unique identifier for supporting secure communication between the passenger boarding bridge and the aircraft during a current alignment operation.

22. A system for automatically aligning an aircraft-engaging end of a passenger boarding bridge with a doorway of an aircraft, comprising:

an imager disposed at a location remote from the aircraft for capturing an image of the lateral surface of the aircraft and for providing image data relating thereto;

a first receiver disposed aboard the aircraft for receiving a first signal including the image data;

a processor for processing the image data to determine a location of the doorway and to format the image data for display, so as to provide a human intelligible indication of the determined location of the doorway;

a display device disposed aboard the aircraft and in communication with the processor, the display device for receiving the formatted image data from the processor and for displaying to the user aboard the aircraft the formatted image data in a human intelligible form;

a user interface disposed aboard the aircraft for receiving an input signal from the user that is indicative of one of a go command and a no-go command for automatically aligning the passenger boarding bridge, and for providing data relating to the input signal;

a transmitter disposed aboard the aircraft and in communication with the user interface, the transmitter for receiving the data relating to the input signal and for transmitting a second signal including the data relating to the input signal; and, a bridge controller for receiving the second signal and for initiating automated alignment of the passenger boarding bridge when the second signal is indicative of a go command and for disabling automated alignment of the passenger boarding bridge when the second signal is indicative of a no-go command.

23. A system according to claim 22, wherein the display device comprises a touch sensitive screen and wherein the user interface comprises at least one of a virtual button and an iconic symbol displayed by the touch sensitive screen.

24. A system according to claim 22, wherein the user interface comprises a biometric information reader.

25. A system according to claim 22, wherein the user interface comprises a security token reader.

26. A system according to claim 22, comprising at least a light source for illuminating a portion of the lateral surface of the aircraft that is being imaged by the imager.

* * * * *